June 9, 1964 E. M. HAFNER 3,136,944
TOTAL FIELD MAGNETOMETER HAVING SERIES CONNECTED INDUCTANCE
ELEMENTS FOR SUBSTANTIAL REMOVAL OF EVEN HARMONICA
Filed Aug. 6, 1945
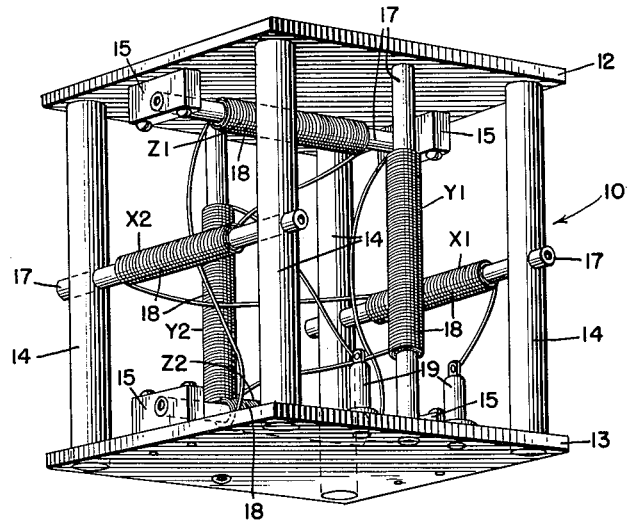
Inventor
E.M. Hafner
By Ralph L Chappell
Attorney

United States Patent Office 3,136,944
Patented June 9, 1964

3,136,944
TOTAL FIELD MAGNETOMETER HAVING SERIES CONNECTED INDUCTANCE ELEMENTS FOR SUBSTANTIAL REMOVAL OF EVEN HARMONICS
Everett M. Hafner, 3417 2nd St. SE., Washington, D.C.
Filed Aug. 6, 1945, Ser. No. 609,307
7 Claims. (Cl. 324—43)
(Granted under Title 35, U.S. Code (1952), sec. 266)

This invention relates generally to magnetometers and more particularly to improvements in the total field magnetomer disclosed and claimed in the co-pending application of Thomas B. Brown for Magnetometer, Serial No. 608,811, filed August 3, 1945.

In the arrangement of the magnetometer of the aforesaid application, three matched electromagnetic field sensitive elements, each having quadratic or square law response to the component of an external magnetic field parallel to the magnetic axis thereof, are arranged with their magnetic axes disposed mutually perpendicular. The elements also are electrically connected such that the individual responses of the elements add to provide a total response which is proportional to the square of the total strength or scalar value of the field. The total response thus obtained is provided substantially independently of the orientation of the magnetometer with respect to the direction of the field.

Each of the sensitive elements is formed as an inductor having a coil and a magnetic core therefor, and each of the coils is so excited and is so proportioned with respect to its core that the inductor comprising them yields an inductance depression which is proportional to the square of the component of the externally applied magnetic field parallel to the magnetic axis of the inductor. This inductance depression is obtained when the external field is superimposed upon a field set up in the core by a sinusoidal exciting current of optimum value, and is measured at the frequency of the exciting current.

Thus, three matched inductors of the aforedescribed character when electrically connected and disposed with their magnetic axes mutually perpendicular each to each other, together yield a total inductance depression which is proportional to the sum of the squares of the three components of an externally applied field or to the square of the absolute magnitude or scalar value of the field. Such a magnetometer also is well adapted to yield an inductance depression or change in inductance which is directly proportional to gradients in the scalar value of the external field, the proportionality factor in such case being itself proportional to the strength of the gradient-free field. The inductance depression or changes therein are measured by a suitable means such, for example, as an inductance bridge circuit in which the output of the bridge circuit is amplified, calibrated or otherwise controlled to provide a quantity indicative of the scalar value of the total field, or selectively of changes therein.

The inductance depression must be measured at the frequency of the exciting current for the reason that voltage components of higher harmonic frequencies appear across the inductor coils by reason of their variable impedance. This is accomplished through employment of suitable filter means whereby all of the frequency components other than that of the exciting current are removed from the output of the bridge circuit. However, it has been found that the presence of even harmonic currents in the inductors leads to a modulation or distortion of the fundamental frequency. This modulation varies with orientation of the magnetometer and therefore gives rise to a spurious signal at the fundamental frequency, which signal is indicative of an apparent gradient in the gradient-free field.

It is a broad object of the present invention, therefore, to provide a new and improved magnetometer in which the measured output thereof is stabilized in response to changes in the orientation of the magnetometer.

It is another object of the invention to provide a new and improved magnetometer in which even harmonic current components generated in the inductor coils are substantially eliminated.

Another object of the invention is to provide a new and improved total field magnetometer in which voltage components of even harmonic frequencies are substantially cancelled within the magnetometer itself thereby obviating the need for filtering of even harmonic components in the measured output of the magnetometer.

Another object is to provide a multi-element total field magnetometer in which cancellation of even harmonic voltage components is produced inherently by the magnetometer elements.

An additional object is to provide a total field magnetometer in which current components of even harmonic frequencies are substantially eliminated without loss of sensitivity at the measured frequency.

In the arrangement of the magnetometer of the present invention, three pairs of the aforedescribed inductors are disposed respectively with the magnetic axes of each pair of inductors in one of three mutually perpendicular planes. The magnetic axes of each pair of inductors are arranged in spaced parallel relation within the plane individual thereto. The individual coils comprising the three pairs of inductors are connected electrically in series such that the total inductance depression, in the presence of an external field, is proportional to the square of the scalar value of the field, in accordance with the principle of the aforesaid application of Thomas B. Brown. In the present arrangement, however, the coils of each pair of inductors are connected in electrical series opposition, i.e., with opposing magnetic polarities. By reason of this arrangement and connection of the coils, substantially complete cancellation of the even harmonic voltage components generated thereby is obtained even in the presence of moderately large external fields when the inductor elements are matched and the three pairs of inductors disposed mutually perpendicular to the greatest exactness physically possible. Moreover, the odd harmonic response or electromotive force of each pair of coils is twice as great as that of the same coil inductor of the aforesaid application of Thomas B. Brown.

Still other advantages, features and objects of the present invention will become more fully apparent as the description proceeds, reference being had to the accompanying drawings in which:

FIG. 1 is a perspective view of a total field magnetometer constructed in accordance with a preferred embodiment of the invention;

FIG. 2 is a diagrammatic view of a suitable circuit for measuring the change in inductance of the magnetometer in the presence of an external magnetic field, or in response to changes in the scalar value of the field; and FIG. 3 is a diagrammatic view of a complete depth charge firing system including the magnetometer of the present invention.

Referring now to the drawings for a more complete understanding of the invention, and more particularly to FIG. 1 thereof, there is shown thereon a magnetometer or composite inductor generally designated by the numeral 10 and comprising three pairs of inductors having their magnetic axes disposed in mutually perpendicular X, Y and Z planes. The inductors in each plane are disposed in spaced parallel relation with respect to each other, the inductors in the X plane being designated X1 and X2, the inductors in the Y plane being designated Y1 and Y2, and the inductors in the Z plane being designated Z1 and Z2. It has been found that optimum quadratic response of the composite inductor may be obtained when the pairs of inductors are arranged in predetermined spaced relation such that the mutual inductance therebetween is reduced to a minimum and the X, Y and Z planes are disposed perpendicular with the greatest exactness physically possible, a suitable arrangement which fulfills these conditions being substantially as shown in FIG. 1.

The inductors may be supported in any convenient manner adapted to provide the required spaced relation therebetween. In the arrangement shown, the mounting structure comprises a pair of plates 12 and 13 which are maintained in fixed spaced relation by means of suitable posts 14. In this arrangement, inductors Y1 and Y2 are disposed in spaced relation and interposed between the plates in the same manner as posts 14, inductors X1 and X2 are disposed in space relation and each is supported between a pair of posts which lie within the same plane therewith. Similarly, inductors Z1 and Z2 are mounted on adjacent plates 12 and 13 respectively by means of suitable supports 15 therefor which may be secured to plates 12 and 13 by any convenient means. It will be understood, however, that the aforedescribed mounting structure, or any other mounting structure suitable for the purpose, necessarily must be formed of non-magnetic and non-conducting material.

The individual inductors generally may be of the same character as those disclosed in the aforementioned application of Thomas B. Brown. It will suffice therefore merely to set forth briefly the characteristics of the inductors which renders each of them capable of providing quadratic response. Each of the inductors comprises a core which is formed of a scroll-rolled strip or sheet of a suitable magnetic material such, for example, as a material known in the art by the trade name of Permalloy. The core is inserted into a tube 17 adapted to provide mechanical protection therefor and adapted to serve as a coil winding form to receive a coil 18 thereon. The tube may be formed of any non-magnetic and non-conducting material suitable for the purpose such, for example, as the material known in the art by the trade name of Sillimanite. It has been discovered that an inductor of the aforedescribed construction in which the coil 18 thereof is formed with an optimum length determined by the dimensions of the core yields an inductance depression or change in inductance which is proportional to the square of the component of an external magnetic field parallel to the magnetic axis of the inductor. This inductance depression is attained when the external field is superimposed upon the field set up in the core of the inductor by a sinusoidal exciting current of optimum value adapted to drive the core into an optimum region of the B–H curve of the core material, the inductance depression being measured at the frequency of the exciting current.

Coils 18 of the inductors are connected in series electrically and the free ends of the series combination are secured to suitable terminals 19 which in turn are suitably secured to plates 12 and 13, thus providing the composite inductor 10. Thus, when the composite inductor 10 is similarly excited and is disposed within an external field whose scalar value is to be measured, the composite inductor yields an inductance depression which is proportional to the square of the magnitude of the total strength or scalar value of the field to an exactness which is dependent only upon the exactness to which the X, Y and Z planes containing the magnetic axes of the pairs of inductors are arranged mutually perpendicular and the exactness with which each pair of inductors provides the same inductance depression for a given change in the component of the external field parallel to the magnetic axis thereof. It has been found that the range from zero value of an external field over which quadratic response may be obtained may be extended to cover the whole range of values for the earth's magnetic field. Moreover, when the foregoing optimum values are closely observed, the magnetometer may be moved about in a gradient-free external field without producing an appreciable spurious inductance depression indicative of an apparent change in the field.

The foregoing proportionality may be expressed by the following equations:

(1) $$Lo - L = KH^2 = \Delta L$$

the inductance depression, where $Lo$ is the total initial inductance of the composite inductor for zero external field;

$L$ is the total inductance value of the composite inductor for external field H;

$K$ is the proportionality factor for the composite inductor;

$H$ is the strength of the total field or scalar value of the external field.

(2) $$L = Lo - KH^2$$

Thus, from Equation 1 it is seen that the change in inductance, or inductance depression, from an initial value in zero external field is proportional to the square of the scalar value of an externally applied field H. Differentiating Equation 2 gives equation (3) $$dL = -2KH dH$$

from which it will also be seen that small changes $dL$ in the value of inductance L are directly proportional to the strength of the external field H and to small changes $dH$ therein.

The coils of each pair of the inductors are connected with opposing magnetic polarities such that the even harmonic voltage components are substantially canceled when the composite inductor 10 is connected as one leg of an inductance bridge circuit, as seen in FIG. 2. By reason of the cancellation of the even harmonic voltage components substantially no even harmonic currents flow in the bridge circuit and the measured output thereof, accordingly, is not distorted or modulated thereby. The bridge circuit also comprises a pair of balanced inductors 21 and 22 and an adjustable inductor 23 and an adjustable resistor 24 for providing an initial balance with inductor 10. The bridge is excited by a pure sinusoidal current of the aforestated optimum value adapted to drive the inductors into the desired region of the B–H curves therefor and having a suitable frequency such, for example, as a frequency in the order of one thousand cycles per second. The exciting current may be supplied by any suitable source, such, for example, as a continuous-wave Hartley oscillator, generally designated 25 and of which the balanced inductors 21 and 22 form a part together with the usual condensers 26 and 27, battery 28 and grid resistor 29. Such an oscillator may be built in a variety of ways from conventional miniature tubes such, for example, as a 1S5 whose total power consumption is in the order of 0.1 watts.

The bridge circuit also includes blocking condensers 31 and 32 for excluding direct current components from the bridge circuit. The output of the bridge circuit appearing at 33 and 34 is filtered by means of an inductance 35 and a condenser 36 to remove all frequency components other than that of the exciting current. The even harmonic components of the bridge current are substantially eliminated by reason of the opposed connections of the pairs of inductor coils comprising composite inductor 10, and the filter, therefore, serves merely to eliminate odd harmonics other than the fundamental, or other selected odd harmonic frequency of the bridge current. Moreover, with such an arrangement of the pairs of coils of the composite inductor the response or inductance depression of each pair of inductors is twice that of a single inductor.

An approximation of the current sensitivity obtained from the foregoing bridge circuit for a given change in an external field may be obtained from the following equation:

$$Io = \frac{Is\Delta Z}{Zs + 2Zo}$$

where $Io$ = output current
$Zo$ = output impedance
$Is$ = excitation current
$Zs$ = the input impedance
$\Delta Z$ = change in impedance of the composite inductor per milligaus change in the external field.

Thus, in a specific bridge circuit wherein $Zo$ = 1500 ohms
$Zs$ = 3000 ohms at 1000 c.p.s.
$\Delta Z$ = 0.1 percent of Z for each unit per milligaus
$Is$ = 1 milliampere
$Io$ = 0.16 microamperes per milligaus change in the scalar value of the total field.

This current sensitivity is obtained when the circuit is operated near balance. The sensitivity improves perceptibly for larger unbalance of the bridge circuit, as readily seen from the aforestated Equation 3, and readily can be increased to 1.0 microampere per milligaus change in the scalar value of the field with reasonable maintenance of stability. When the bridge unbalance is large, the signal current may be rectified as by a copper-oxide rectifier 37 and made readable on a low range meter 38 using a large electrolytic condenser 39 in series with the meter and by working with rapid signals.

FIG. 3 illustrates diagrammatically a depth charge firing system employing the composite inductor 10 as a means for detecting changes in the ambient field as the depth charge moves into proximity with a submarine adapted to be destroyed thereby. The composite inductor is well adapted for use as the detector of such a system for the reason that the inductance depression yielded thereby in response to changes in the ambient field is given substantially independently of the direction of the ambient field. Moreover, substantially no inductance depression is yielded in response to movement of the detector within the earth's magnetic field in a gradient-free condition thereof. The extent to which the foregoing resopnse may be obtained, of course, is controlled by the exactness to which the aforestated optimum values and configuration of the composite inductors is observed. The depth charge firing mechanism may be of any type suitable for the purpose but preferably is of a type having control and firing circuits similar to those disclosed in the copending application of Joseph B. Tate et al. for Depth Charge Firing System, Ser. No. 621,155, filed October 8, 1945.

From the foregoing it should now be apparent that a magnetometer has been provided which is well adapted to fulfill the aforestated objects of the invention. Moreover, while a specific embodiment of the magnetometer and certain specific applications therefor have been described in particularity, it will be apparent to those skilled in the art to which the invention appertains, after understanding the invention, that the same is susceptible of additional embodiments and adaptations without departing from the spirit and scope of the invention as defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. A total field magnetometer of the character disclosed comprising, in combination, three pairs of electromagnetic field sensitive elements, said pairs of elements being connected in series and disposed in mutually perpendicular space relation such that the elements together yield a total quantity substantially proportional to the square of the total strength of an external magnetic field when the elements are excited by the same soinusoidal current of optimum value, each of said elements being adapted to yield a quantity substantially proportional to the square of the component of the external field parallel to the magnetic axis thereof, and the elements of each of said pairs of elements being electrically connected in series opposition whereby even harmonic voltage components generated thereby cancel and substantially no even harmonic frequency components appear in said total quantity.

2. A total field magnetometer of the character disclosed comprising, in combination, three pairs of electromagnetic field sensitive elements, means for supporting said elements in predetermined space relation such that said three pairs of elements are disposed in three mutually perpendicular planes respectively with the elements of each pair parallel to and spaced from one another whereby electromagnetic coupling between the elements is reduced to a minimum, each of said elements being adapted to yield a measurable quantity substantially proportional to the square of the component of an external magnetic field parallel to the magnetic axis thereof, said pairs of elements being connected in series whereby the individual quantities add to give a total quantity substantially proportional to the square of the scalar value of the external field when the elements are excited by the same sinusoidal current of optimum value, the elements of each of said three pairs of elements being electrically connected in series with opposing magnetic polarities whereby substantially no even harmonic frequency components appear in said total quantity.

3. In a total field measuring circuit of the character disclosed, the combination of a total field magnetometer of a character adapted to yield a quantity whose magnitude is determined by the scalar value of an external magnetic field or selectively of a small change therein, comprising a first set of mutually perpendicular coil and core elements, sinusoidal excitation means for said magnetomer, a circuit for producing an alternating current signal in accordance with the magnitude of said quantity, means comprising a second set of coil and core elements inherently a part of said magnetometer disposed respectively in parallel spaced relation to said first set of elements and electrically connected respectively in series opposition therewith for substantially eliminating even harmonic frequency components in said signal, and means controlled by said signal for indicating the value of the field or selectively of said change therein.

4. In a total field measuring circuit of the character disclosed, the combination of a total field magnetometer including a plurality of series connected inductor elements comprising pairs of series opposition connected coils disposed in mutually perpendicular relation and adapted to yield a quantity whose magnitude is determined by the scalar value of an external magnetic field or selectively of a small change therein, a bridge circuit including said inductor elements for producing an alter nating current signal in accordance with the magnitude of said quantity, said inductor elements being so arrangd as to cancel even harmonic voltage components generated thereby, and means controlled by the signal for indicating the value of the field or selectively of said change therein.

5. In a total field control circuit for a depth charge, the combination of a magnetometer comprising a plurality of matched pairs of inductors respectively disposed in parallel spaced relation with the paired inductors mutually perpendicular and connected to yield an inductance depression substantially proportional to the square of the scalar value of an external magnetic field when the inductors are excited with a common sinusoidal current of optimum value, an inductance bridge circuit having said magnetometer as one of the legs thereof, means for exciting said bridge circuit with said sinusoidal current of optimum value, said inductors being adapted to inherently cancel even harmonic voltage components generated thereby and to eliminate even harmonic frequency components in said bridge current, means for eliminating all but one predetermined odd harmonic frequency component in said bridge current, and means controlled by said predetermined odd harmonic frequency component of the bridge current for controlling the operation of the depth charge in accordance with variations in the scalar value of the field.

6. A total field magnetometer of the character disclosed comprising, in combination, a plurality of matched pairs of parallel spaced, mutually perpendicular, and series connected inductors adapted to yield an inductance depression susbtantially proportional to the square of the scalar value of an external magnetic field when the inductors are excited by a common sinusoidal current of optimum value, the respective matched inductors of said pairs being connected in series opposition, a bridge circuit including said inductors as one of the legs thereof and adapted to produce an output current having a predetermined frequency component which varies in value in accordance with the magnitude of said inductance depression, means for exciting said bridge circuit with said sinusoidal current of optimum value, means for eliminating all frequency components except said predetermined frequency component from said output current, means for substantially reducing distortion of said predetermined frequency component due to harmonic frequency components generated by the inductors, and means adapted to be operated by said predetermined frequency component in accordance with predetermined changes in the scalar value of the field.

7. In combination in a total field magnetometer of the character described, three pairs of mutually perpendicular inductance elements disposed with the elements of each pair mutually spaced and connected in series opposition, means providing sinusoidal excitations for said inductances in series connected relationship therethrough, and means connected therewith to provide an output indication correlative with a reduction in the apparent inductance therethrough, the electrical connection of said pairs of inductances being of a character adapted to substantially remove even harmonic frequency components in said output and to provide a series additive output value substantially proportional to the scalar value of the external field when the elements are excited by the sinusoidal excitation means thereof.

References Cited in the file of this patent
UNITED STATES PATENTS

| | | |
|---|---|---|
| 1,896,737 | Zuschlag | Feb. 7, 1933 |
| 2,241,499 | Barth | May 13, 1941 |
| 2,374,166 | Beach et al. | Apr. 24, 1945 |
| 2,379,716 | Hull | July 3, 1945 |
| 2,390,051 | Barth | Dec. 4, 1945 |
| 2,403,347 | Deep et al. | July 2, 1946 |
| 2,438,964 | Cunningham et al. | Apr. 6, 1948 |